April 7, 1964 G. S. LYCHYK ETAL 3,128,356

MOUNTING LUGS AND BOBBIN FOR DRY REED RELAYS

Filed July 28, 1961

INVENTORS
George S. Lychyk
Arvo Taliste
BY
Atty.

United States Patent Office 3,128,356
Patented Apr. 7, 1964

3,128,356
MOUNTING LUGS AND BOBBIN FOR DRY REED RELAYS

George S. Lychyk, Cicero, and Arvo Taliste, Oak Park, Ill., assignors to Automatic Electric Laboratories, Inc., Northlake, Ill., a corporation of Delaware Filed July 28, 1961, Ser. No. 127,648
4 Claims. (Cl. 200—87)

The present invention relates to electro-magnetic devices and, more particularly, to dry reed relays.

Relays of the prior art which are adapted for printed circuit board mounting are typically either mounted in a parallel plane with the mounting board or in a plane normal to the mounting board. These relays although adequate for the most part display some features which impose design limitations in at least certain applications. For example, the relays mounted parallel to the board require a relatively large space for mounting. Thus, the boards for the relays become unduly large and the corresponding conductors unnecessarily long. This feature can be undesirable in applications where a large number of relays are mounted to a printed circuit board. On the other hand, while the upright or end mounted relays of the prior art correct this problem to some extent they do however require separate receptacles for mounting and connecting.

The drawbacks of these arrangements are accentuated where the relays are mounted and connected at the crosspoints of an array comprising horizontal and vertical conductors disposed on opposite sides of an insulating board, reference being made to the arrangement disclosed and claimed in co-pending application Serial No. 127,237, filed on July 27, 1961, by K. K. Spellnes and E. J. Glenner, and assigned to the same assignee. In such instances a compact mounting arrangement which affords a most direct and most simple conductor configuration is desired.

Accordingly this invention discloses an improved relay structure that is adapted for use in a compact mounting arrangement and, more particularly, for use with a crosspoint array as aforementioned.

Therefore, one object of this invention is to provide a dry reed relay with mounting plugs conforming to a unique design and arranged in a most efficient pattern for making connections with conductors.

Another object of the invention is to provide a dry reed relay with a mounting arrangement requiring a minimum amount of mounting space.

Still another object of the invention is to provide a dry reed relay whose cost of manufacture is minimized as a result of a simplified design.

In a preferred embodiment of the invention these objects are realized by a relay with a number of encapsulated cantilever type reed switches, an integrally molded frame structure which contains the switches and also provides a rectangular mounting base for the relay, an energizing coil which activates the reeds and which is mounted on the frame structure, and a plurality of push-in type terminal members on the four sides of the rectangular base which facilitate mounting of the relay to a printed circuit board.

These and additional objects and features of the invention will become more apparent from a perusal of the following detailed description taken in conjunction with the accompanying drawings of which:

Figure 1:
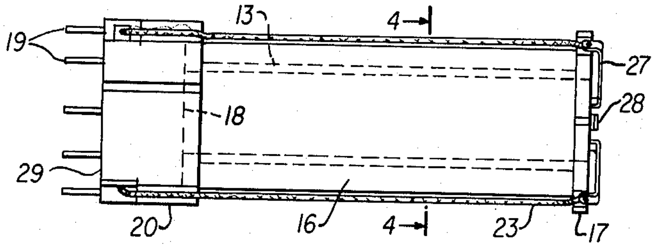
FIG. 1 is a side elevational view of the relay in accord with the teachings of this invention.
Figure 2:
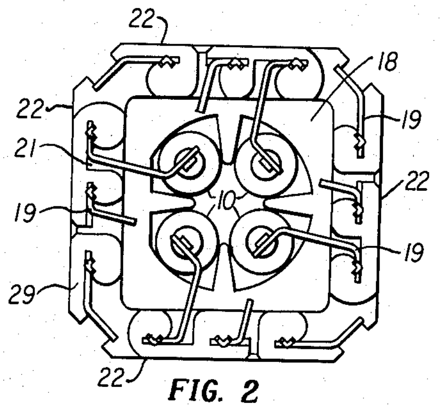
FIG. 2 is a bottom or an end view of the relay shown in FIG. 1.
Figure 3:
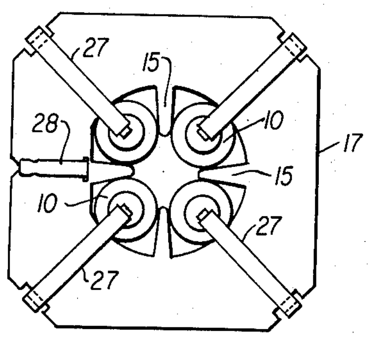
FIG. 3 is a top view of the relay shown in FIG. 1.
Figure 4:
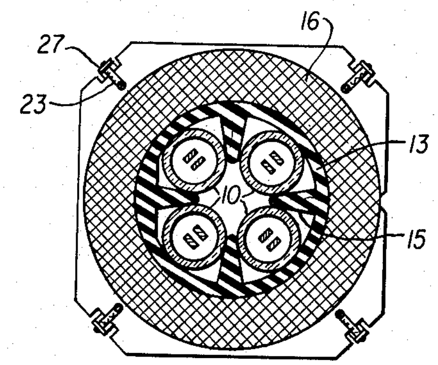
FIG. 4 is a cross-section view of the relay shown in FIG. 1 and taken substantially along line 4—4.

Referring now to FIGS. 1, 2, 3 and 4, the energizing coil denoted by character 16 is wound on a bobbin or a tubular section 13 which is integrally molded to base 20 and made of insulating material, for example a plastic. The coil is contained by top flange 17 at one end of the tubular section 13 and flange 18 at the opposite end thereof. Flange 17 receives an auxiliary lug 28 and is rectangular shaped having non-square corners.

Figure 5:
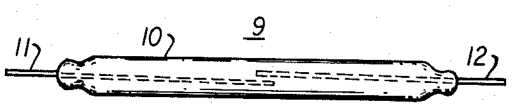
FIG. 5 is a side elevational view of a reed switch capsule used in the relay and FIG. 6 is a perspective view of the push-in type terminal used in the base of the relay as shown in FIG. 2.

Referring in particular to FIG. 5, the reed switches 9 comprise two reeds 11 and 12. One end of each reed extends external of and the other end of each reed internal of the vitreous capsule 10. The inwardly extending ends overlap at the contact areas and magnetically cooperate with each other. The external ends of the reeds 12 are connected to extension terminals 27, specifically shown in FIG. 3. These extension terminals extend to the edge of the flange 17 where wires 23 are connected to them. The wires 23 in turn extend over the coil 16 and are connected to terminal members 19 located in the base 20. On the other hand, the external ends of reeds 11 are connected to terminal members 19 located in the base 20.

Base 20 is integrally molded to the outer surface of flange 18 and consists of four extending legs 22. Each leg serves as a side to a rectangular base. At the edge 29 of these legs are a plurality of inwardly extending slots, corresponding in number to the number of terminal members 19 used in the relay. These slots receive the terminal members 19. A feature of this arrangement is that the terminal members 19 can be pushed into place by either manual or automatically actuated means. Also, it is to be noted that the slots are molded into the base 20 and do not require a separate machine operation for their being.

Figure 6:
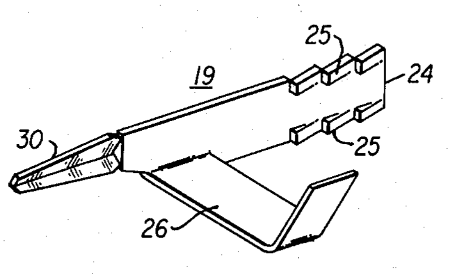

Terminal members 19 are shown in FIG. 6 and comprise a tapered V-shaped pin 30 at one end for mounting the relay to a mounting board, a tab 24 at the opposite end which has sawtooth edges 25 for self locking the terminal members 19 into the base 20, and a terminal arm 26 which extends normal to the longitudinal axis of the terminal member. Furthermore, the terminal member is constructed out of a relatively strong material, as for example, a tin plated brass material.

The V-shaped pins facilitate in mounting the relays to mounting boards. For instance the pins are inserted into eyelets or holes of a printed circuit board and held therein by the friction between the pins and the mounting board. The friction is increased by virtue of the tapered shape of the pin.

The terminal arms 26 extend inwardly from the four side legs 22 and are used for the purpose of making connection to either the external ends of reeds 11, the wires 23 which are connected to the corresponding external ends of reeds 12, or to the coil 16. Each terminal arm 26 is of a length appropriate for the particular use to which it is put. The longer terminal arms 26 are connected to the external ends of reeds 11, whereas the shorter ones may be connected to the coil 16. An important feature demonstrated here is that there is a direct connection between the terminal members 19 and the reeds 11. No additional wires are required and therefore assembly cost is reduced.

Another feature of the invention is the inclusion of ribs 15 which aid in securing the switch capsules within the tubular section 13. Ribs 15 radially extend from an inner surface of the tubular section 13 and are adjacent to the glass capsules of the switches. Resulting from this arrangement is that any adverse effects from a difference in the expansion coefficient in the bobbin and the glass capsules is relieved. Whereas this difference would normally result in distortion in one or both of the mating parts or even cause breakage in some instances it is here avoided because each glass capsule makes only line contact with the bobbin. Two such contact lines are made with adjacent rib members and the other is made with the inner surface of the tubular section.

Reeds 11 and 12 are connected to the terminal member 19 and extension terminals 27 respectively which keep the switches from any longitudinal movement relative to the bobbin.

It should be apparent from the above described structure that the design according to the invention provides a relay whose cost of manufacture and cost of assembly is minimized. This is accomplished by virtue of the frame structure being in one piece instead of the conventional separate pieces and comprise both the bobbin and base part of the relay. Furthermore, the reed switch capsules can be securely positioned within the tubular section 13 and connected to their corresponding related parts of the relay in a simplified fashion.

Figure 7:
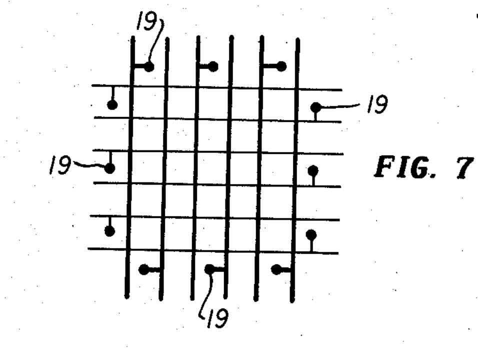
FIG. 7 is a schematic view of a relay according to the invention electrically connected to printed windings of a cross coordinate array.

Referring to FIG. 7, the relay is especially adapted for being mounted to a matrix of horizontal and vertical printed windings of the type disclosed and claimed in co-pending application Serial No. 132,897, filed on August 21, 1961, Matrix Printed Circuit Board, by R. O. Stoehr, P. K. Gerlack and G. J. David. With this type matrix the rectangular base of the relay and the configuration of the terminals mounted therein become most advantageous features. The terminal members 19 placed in the two vertical planes, as viewed in FIG. 7, may then be connected to the horizontal conductors disposed on one surface of the insulating board, and the terminal members 19 placed in the two horizontal planes, as viewed in FIG. 7, connected to the vertical conductors disposed on the opposite surface of the insulating board. The diagram of the conductors are thus laid out in a simple, substantially right angle pattern involving no crossovers.

The invention has been described in detail however it is to be understood that many variations and modifications of the structure and the arrangement thereof can be made without departing from the spirit and scope of the invention as hereinafter claimed.

What is claimed is:

1. A reed relay comprising:

a coil;

a plurality of reed switches activated upon the energization of said coil and having each a vitreous capsule with a circumferential surface;

and a tubular shaped bobbin supporting said coil and having an inner surface with a plurality of rib members extending therefrom, each of said vitreous capsules making line contact with adjacent ones of said rib members and with said inner surface to contain said switches within said bobbin and to provide relief from adverse effects resulting from a difference in the expansion coefficient of said bobbin and said vitreous capsules.

2. A reed relay comprising: a plurality of encapsulated reed switches; a bobbin made of insulating material surrounding said switches, a coil wound on said bobbin for activating said reed switches, a rectangularly shaped mounting base integrally molded with said bobbin, said base having four legs which extend outwardly from said bobbin, and a plurality of plug-in terminal members arranged along the edge of each of said legs, certain ones of said terminal members connected to said switches and certain other ones of said terminal members connected to said coil.

3. A reed relay as claimed in claim 2 wherein said terminal members comprise at one end a tapered plug-in pin and at the opposite end a tab having sawtooth edges for self-locking within said legs, and a terminal arm extending normal to and positioned intermediate the said two ends, said terminal arm of certain ones of said members being connected to the ends of said switches and said terminal arm of certain others of said members connected to said coil.

4. A reed relay comprising: a plurality of encapsulated reed switches; an integrally molded frame structure made of plastic material and having a tubular section with ribs extending inwardly from the inner surface thereof for receiving and separating each of said switches, two flanges at the ends of said tubular section, and a square-shaped mounting base having four legs, one leg at each side of the square, extending outwardly from one of said flanges, each of said legs having at least one slot arranged along the bottom edge thereof, an energizing coil wound on said tubular section and contained by said flanges, and a plurality of push-in terminal members disposed within said slots in said legs, at least certain ones of said terminal members being connected to said reed switches and certain other ones of said terminal members being connected to said coil.

References Cited in the file of this patent

UNITED STATES PATENTS

| | | |
|---|---|---|
| 2,187,115 | Ellwood et al. | Jan. 16, 1940 |
| 2,534,354 | Keller | Dec. 19, 1950 |
| 2,889,424 | Glore et al. | June 2, 1959 |
| 2,993,103 | Zimmer | July 18, 1961 |

FOREIGN PATENTS

| | | |
|---|---|---|
| 674,597 | Germany | Apr. 17, 1939 |